United States Patent
Mercier et al.

(10) Patent No.: US 6,903,466 B1
(45) Date of Patent: Jun. 7, 2005

(54) WIND-POWER GENERATOR POD CONSTITUTED BY THE BODY OF AN ELECTRICITY GENERATOR

(75) Inventors: Jean-Charles Mercier, Ludres (FR); Stéphane Feron, Paris (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/653,408

(22) Filed: Aug. 31, 2000

(30) Foreign Application Priority Data

Sep. 1, 1999 (FR) .............................. 99 10974

(51) Int. Cl.[7] .............................. F03D 9/00; H02P 9/04
(52) U.S. Cl. .............................. 290/44; 290/55
(58) Field of Search .............................. 290/55, 44; 415/7, 415/2.1, 4.2, 907; 416/132.13, 141, 226, 111, 122, 11, 60, 7, 132 B; 60/641.02, 641.11; 310/64, 65, 50–62

(56) References Cited

U.S. PATENT DOCUMENTS

| | | | | |
|---|---|---|---|---|
| 1,312,021 A | * | 8/1919 | Dickinson .............................. | 290/55 |
| 1,362,753 A | | 12/1920 | Sperry .............................. | 290/44 |
| 2,655,604 A | * | 10/1953 | Hutter .............................. | 290/55 |
| 2,939,017 A | | 5/1960 | Teague, Jr. et al. .............................. | 290/44 |
| 3,076,510 A | * | 2/1963 | Piel .............................. | 415/150 |
| 3,684,906 A | * | 8/1972 | Lenz .............................. | 310/61 |
| 3,838,947 A | * | 10/1974 | Laing .............................. | 165/104.21 |
| 3,859,785 A | * | 1/1975 | Leto et al. .............................. | 60/802 |
| 3,916,231 A | * | 10/1975 | Cathey .............................. | 310/62 |
| 3,939,357 A | | 2/1976 | Ziegler .............................. | 290/52 |
| 4,086,498 A | * | 4/1978 | Szoeke .............................. | 290/55 |
| 4,189,648 A | * | 2/1980 | Harner .............................. | 290/44 |
| 4,191,505 A | * | 3/1980 | Kaufman .............................. | 415/7 |
| 4,289,970 A | | 9/1981 | Deibert .............................. | 290/44 |
| 4,350,898 A | | 9/1982 | Benoit .............................. | 290/55 |
| 4,366,386 A | * | 12/1982 | Hanson .............................. | 290/44 |
| 4,366,387 A | | 12/1982 | Carter et al. .............................. | 290/55 |
| 4,370,095 A | | 1/1983 | Sleeper, Jr. .............................. | 416/175 |
| 4,398,096 A | * | 8/1983 | Faurholtz .............................. | 290/55 |
| 4,442,371 A | * | 4/1984 | Utsunomiya et al. .............................. | 310/260 |
| 4,445,046 A | | 4/1984 | Allegre et al. .............................. | 290/52 |
| 4,461,957 A | * | 7/1984 | Jallen .............................. | 290/44 |
| 4,476,395 A | * | 10/1984 | Cronin .............................. | 290/6 |
| 4,491,739 A | * | 1/1985 | Watson .............................. | 290/44 |
| 4,514,652 A | * | 4/1985 | Olson .............................. | 310/54 |
| 4,613,279 A | * | 9/1986 | Corren et al. .............................. | 415/2 |
| 4,720,640 A | * | 1/1988 | Anderson et al. .............................. | 290/43 |
| 4,767,939 A | | 8/1988 | Calley .............................. | 290/55 |
| 4,797,602 A | * | 1/1989 | West .............................. | 290/46 |
| 4,948,997 A | * | 8/1990 | Ohmitsu et al. .............................. | 290/38 R |
| 5,196,747 A | * | 3/1993 | Kress et al. .............................. | 310/158 |
| 5,306,972 A | * | 4/1994 | Hokanson et al. .............................. | 310/58 |
| 5,457,346 A | * | 10/1995 | Blumberg et al. .............................. | 290/55 |
| 5,484,120 A | * | 1/1996 | Blakeley et al. .............................. | 244/54 |
| 5,599,172 A | * | 2/1997 | McCabe .............................. | 417/334 |
| 5,669,758 A | * | 9/1997 | Williamson .............................. | 416/4 |
| 5,723,926 A | * | 3/1998 | Obara et al. .............................. | 29/596 |
| 5,903,073 A | * | 5/1999 | Mukai .............................. | 310/64 |
| 5,910,688 A | * | 6/1999 | Li .............................. | 290/55 |
| 5,977,667 A | * | 11/1999 | Hirose .............................. | 290/1 B |
| 6,133,659 A | | 10/2000 | Rao .............................. | 310/89 |
| 6,210,130 B1 | * | 4/2001 | Kakuda et al. .............................. | 417/363 |
| 6,215,199 B1 | | 4/2001 | Lysenko et al. .............................. | 290/44 |
| 6,278,197 B1 | * | 8/2001 | Appa .............................. | 290/55 |
| 6,404,091 B1 | * | 6/2002 | Nakamura et al. .............................. | 310/179 |
| 6,452,287 B1 | | 9/2002 | Looker .............................. | 290/55 |

FOREIGN PATENT DOCUMENTS

DE      196 36 591 A1      3/1998
DE      19643362 A1        4/1998

* cited by examiner

Primary Examiner—Darren Schuberg
Assistant Examiner—Julio Gonzalez Ramirez
(74) Attorney, Agent, or Firm—Sughrue Mion, PLLC

(57) ABSTRACT

The pod of wind-powered generator is constituted by a rigid fairing in which at least one electricity generator for coupling to at least one wind-driven propeller is disposed. The rigid fairing of the pod is formed by the body of the generator in which there are mounted a stator and a rotor, thereby simplifying the structure of the pod.

6 Claims, 1 Drawing Sheet

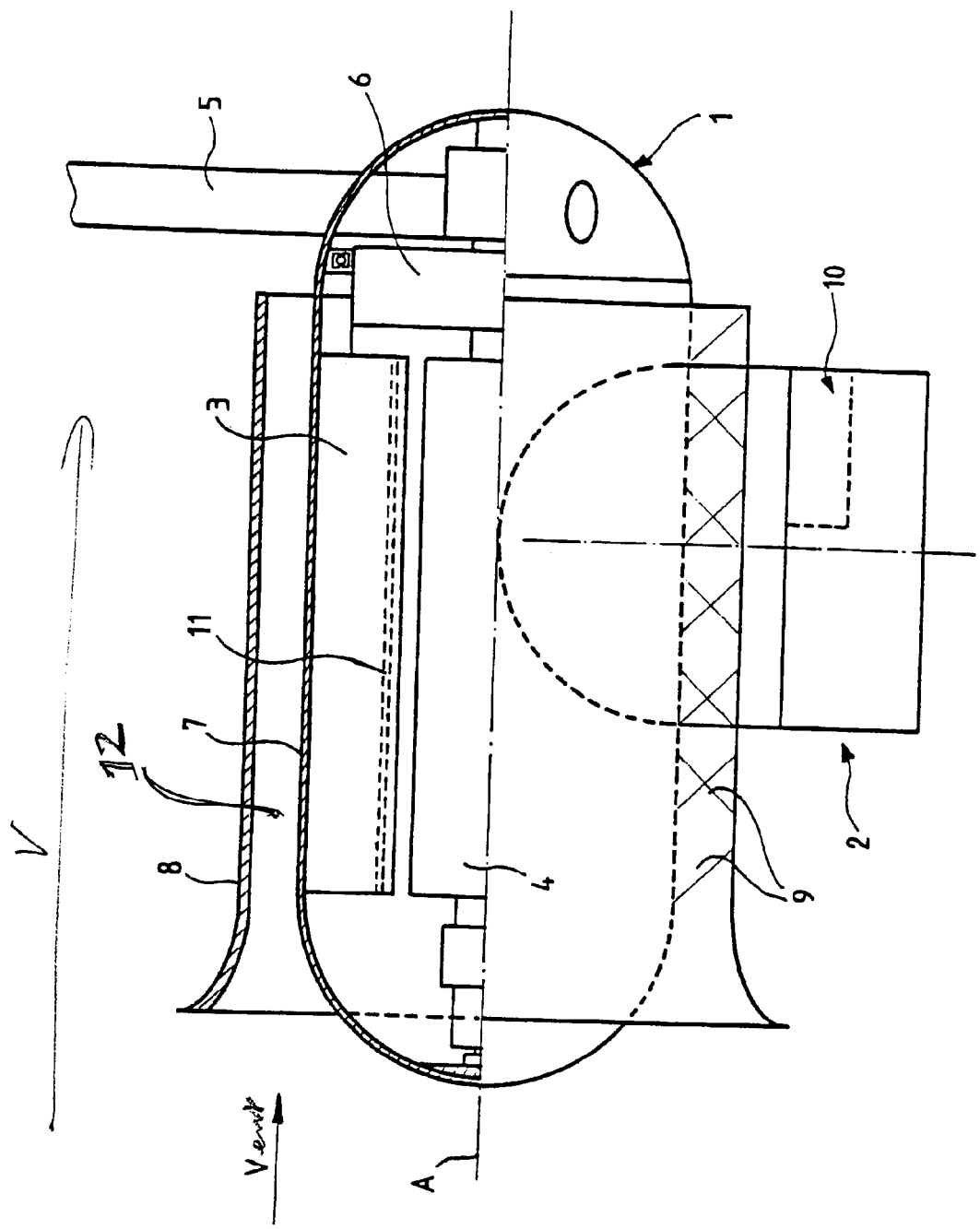

WIND-POWER GENERATOR POD CONSTITUTED BY THE BODY OF AN ELECTRICITY GENERATOR

The invention relates to a pod for a wind-power generator, the pod being constituted by a rigid fairing in which at least one electricity generator is placed for the purpose of being coupled to at least one wind-driven propeller.

BACKGROUND OF THE INVENTION

The fairing in a pod of that type is normally made of composite material or of metal and requires special adaptations to cool its internal elements such as the electricity generator. In particular, it is conventional to provide systems for ventilating the inside of the pod, thereby complicating its structure and increasing its weight.

OBJECT AND SUMMARY OF THE INVENTION

The object of the invention is to remedy that drawback.

According to the invention, the rigid fairing of the pod is formed by the body of the generator in which a stator and a rotor are mounted. This generator body can advantageously contain the gearing of the gearbox and the mechanism for steering the pod, thereby making the pod of the wind-power generator more compact. This simplifies installing the wind-power generator. In addition, this arrangement makes it possible to use the fairing of the pod as a heat exchange surface for cooling the generator and the gearbox. Since the propeller is mounted at the rear of the pod, the wind which drives the propeller of the wind-power generator flows over the body of the generator, thereby improving heat exchange when the generator is in operation.

To maintain laminar flow over the entire length of the pod for the wind driving the propeller, provision can advantageously be made for the rigid fairing of the pod to be surrounded by a tubular sleeve forming a substantially annular passage for air along the pod.

To further increase heat exchange between the stator and the fairing of the pod, provision can be made for the fairing of the pod to be an interference fit on or to intimately contact the stator of the generator. This arrangement also reinforces the mechanical cohesion of the elements mounted inside the pod and reduces vibration phenomena.

The flow of hot air created by the rotation of the rotor is advantageously directed towards the inside surface of the fairing of the pod via lateral openings extending right through the stator.

In a particular embodiment of the pod of the invention, the generator is coupled to the propeller via an epicyclic gearbox having inlet and outlet shafts that are on the same axis, thus enabling the propeller to be mounted directly on the outlet of the shaft of the generator. This arrangement also contributes to reducing the number of gear wheels in the gearbox.

BRIEF DESCRIPTION OF THE DRAWING

The wind-power generator pod of the invention is described below in detail with reference to the sole FIGURE which shows it in highly diagrammatic manner as mounted at the top of a mast.

MORE DETAILED DESCRIPTION

The highly diagrammatic figure shows part of a wind-power generator comprising a pod 1 mounted to swivel at the top of a vertical mast 2.

As can be seen in the figure, the pod 1 is substantially cylindrical in shape extending along an axis of revolution A that is perpendicular to the mast 2.

An electricity generator constituted by a stator 3 and a rotor 4 (shown in part in the figure above the axis A) is mounted inside the pod 1 and is coupled to a least one propeller 5 via an epicyclic gearbox (stepdown gearbox) 6.

The rigid outer fairing 7 of the pod 1 is formed by the metal body of the generator. The outer fairing 7 is surrounded coaxially by a tubular sleeve 8 which forms an annular passage 12 for the wind V driving the propeller 5. The end of the sleeve 8 facing the wind V is flared in this case and the propeller 5 is mounted at the back of the pod 1 relative to the wind direction so as to maintain a degree of stability in the flow of air along the passage 12 formed by the sleeve 8. The gearbox 6 is mounted inside the fairing 7 and the propeller 5 is fixed directly to the outlet of the shaft, thereby simplifying mechanical assembly and in particular simplifying coupling between the generator and the gearbox.

The sleeve 8 can be held at a distance from the fairing 7 by means of supporting cross-members 9.

A system 10 for steering the pod 1 is shown as being integrated in the top of the mast 2, but can be located inside the pod 1 which would contribute to simplifying installation of the wind-power generator.

The fairing 7 is advantageously an interference fit on or intimately contacts the stator 3, and lateral openings 11 pass through the stator 3 so as to direct the hot air created by rotation of the rotor 4 against the fairing 7 so that the hot air is cooled by flowing along the fairing 7 which acts as a heat exchanger with the air on the outside of the pod 1.

What is claimed is:

1. A wind-power generator pod comprising:
   a rigid fairing in which at least one electricity generator is disposed for coupling to at least one wind-driven propeller, wherein the rigid fairing constitutes a body of the generator in which a stator and a rotor are mounted, such that the stator contacts the fairing, and
   wherein lateral openings extend through the stator: the rigid fairing is surrounded by a tubular sleeve forming a substantially annular air passage between the rigid fairing and the tubular sleeve; the tubular sleeve has an end portion which is flared outwardly; and the end portion which is flared outwardly is disposed towards an end of the fairing which is opposite the wind-driven propeller.

2. The pod according to claim 1, in which the rigid fairing is attached to the stator of the generator via an interference fit.

3. The pod according to claim 1, in which the generator is coupled to the wind propeller via an epicyclic gearbox.

4. The pod according to claim 3, in which the gearbox is mounted inside the rigid fairing.

5. A wind-powered generator comprising a pod according to claim 1 and mounted to swivel at the end of a mast.

6. The pod according to claim 1, wherein the tubular sleeve is shorter in length than the fairing.

* * * * *